(12) United States Patent
Miyashita

(10) Patent No.: US 8,144,231 B2
(45) Date of Patent: Mar. 27, 2012

(54) METHOD AND DEVICE FOR DISPLAYING IMAGES SIMULATED BASED ON DIFFERENT SHOOTING CONDITIONS

(75) Inventor: Mamoru Miyashita, Saitama (JP)

(73) Assignee: Fujifilm Corporation, Tokyo (JP)

( * ) Notice: Subject to any disclaimer, the term of this patent is extended or adjusted under 35 U.S.C. 154(b) by 974 days.

(21) Appl. No.: 12/153,877

(22) Filed: May 27, 2008

(65) Prior Publication Data

US 2008/0297622 A1    Dec. 4, 2008

(30) Foreign Application Priority Data

May 29, 2007    (JP) ................................ 2007-141953

(51) Int. Cl.
*H04N 5/222* (2006.01)
*H04N 5/76* (2006.01)

(52) U.S. Cl. ............ 348/333.05; 348/333.11; 348/231.6

(58) Field of Classification Search ............... 348/222.1, 348/231.6, 239, 333.01–333.11
See application file for complete search history.

(56) References Cited

U.S. PATENT DOCUMENTS

| | | | |
|---|---|---|---|
| 7,358,988 B1 | 4/2008 | Konishi et al. | |
| 2004/0100567 A1* | 5/2004 | Miller et al. | 348/239 |
| 2005/0131856 A1* | 6/2005 | O'Dea | 707/1 |
| 2006/0012690 A1* | 1/2006 | Nakamura et al. | 348/231.6 |
| 2007/0065137 A1* | 3/2007 | Hara et al. | 396/291 |
| 2007/0086675 A1* | 4/2007 | Chinen et al. | 382/284 |
| 2007/0153113 A1* | 7/2007 | Ueda et al. | 348/335 |
| 2007/0277221 A1* | 11/2007 | Davis et al. | 725/151 |
| 2007/0279512 A1* | 12/2007 | Maruyama et al. | 348/333.11 |
| 2007/0286596 A1* | 12/2007 | Lonn | 396/429 |

FOREIGN PATENT DOCUMENTS

| | | |
|---|---|---|
| JP | 5-110912 | 4/1993 |
| JP | 10-155111 | 6/1998 |
| JP | 10-262164 | 9/1998 |
| JP | 2001-54013 | 2/2001 |
| JP | 2004-207886 | 7/2004 |
| JP | 2005-159995 | 6/2005 |
| JP | 2005-347985 | 12/2005 |
| JP | 2006-50475 | 2/2006 |
| JP | 2006-74676 | 3/2006 |
| JP | 2006-157153 | 6/2006 |

OTHER PUBLICATIONS

Japanese Office Action dated May 18, 2011 with English-language translation.
Japanese Office Action dated May 18, 2011 with English-language translation.

* cited by examiner

*Primary Examiner* — Lin Ye
*Assistant Examiner* — Euel Cowan
(74) *Attorney, Agent, or Firm* — McGinn IP Law Group, PLLC

(57) ABSTRACT

During framing, an image sensor captures an image of a subject and produces an image signal. The image signal is chronologically retrieved and sent to plural signal processing sections. The signal processing sections concurrently produce frames simulated based on different shooting conditions or different shooting modes. Images of frames are displayed on a screen of a display side by side. When a shutter button is pressed after selecting a desired image, an image is captured for recording under the shooting condition or the shooting mode corresponding to the selected image.

16 Claims, 15 Drawing Sheets

METHOD AND DEVICE FOR DISPLAYING IMAGES SIMULATED BASED ON DIFFERENT SHOOTING CONDITIONS

FIELD OF THE INVENTION

The present invention relates to an image display method and an image display device of camera, and more particularly to an image display method and an image display device for displaying a plurality of images simulated based on different shooting conditions side by side during framing that is performed before image recording.

BACKGROUND OF THE INVENTION

Electronic still cameras (digital cameras) and video cameras perform framing to check position and size of a subject. This framing is performed before recording an image by pressing a shutter button. In the framing, an image sensor such as CCD and MOS produces through images by capturing a main subject at a predetermined frame rate. The through images are shown on a display. A user observes the through images and checks position, size, condition and the like of the main subject. The display is provided on a rear surface of a camera body or foldably attached to the camera body.

In still image capture, one frame is captured with a single press of the shutter button. The recent cameras adopt a function to continuously capture multiple frames with different shooting conditions, such as exposure values, so as not to miss shutter chances. For example, cameras with Auto Exposure Bracketing (AEB) function capture several frames in sequence at different exposure values: one frame at an appropriate exposure value, and several other frames at the exposure values in ½ or ⅓-step increments compared to the appropriate exposure value.

It is convenient if each frame with different shooting condition can be checked before recording an image. It is proposed for film cameras that plural images with different shooting conditions simulating frames to be recorded on a photographic film are displayed side by side during the framing (Japanese Patent Laid-Open Publication No. 5-110912). The film camera disclosed in the above publication is provided with a photographing optical system for recording frames on the photographic film. Besides the photographing optical system, the film camera is also provided with an electronic view finder (EVF). This EVF is constituted of a finder optical system, an aperture stop, an image sensor, and a liquid crystal panel. The image sensor in the EVF sequentially captures plural frames while gradually changing an exposure value and stores the frames to a memory. The frames are an image corresponding to a frame to be recorded on the film at an appropriate exposure value and at least an image corresponding to a frame to be recorded on the film with exposure compensation applied to the appropriate exposure value. The images read out from the memory are displayed small side by side on the liquid crystal panel. When an aperture stop value as the shooting condition is changed, frames are captured with the image sensor while gradually changing the aperture stop. When a shutter speed is changed, frames are captured while gradually changing charge storage time of the image sensor.

In this film camera, the images displayed on the liquid crystal panel are observed and one with an appropriate brightness for its main subject is selected. Then, the shooting condition providing this image is selected and a picture is taken. In this film camera, however, it takes time before displaying plural frames side by side since the images are captured with the image sensor while changing the shooting condition such as the exposure value. For this configuration, the condition of the main subject may differ from frame to frame when the subject varies constantly. Accordingly, it becomes difficult to properly evaluate the frames. Moreover, the state of the main subject changes between when the images are displayed on the liquid crystal panel and when the shutter button is pressed.

SUMMARY OF THE INVENTION

It is an object of the present invention to provide an image display method and an image display device capable of quickly displaying plural image frames with different shooting conditions side by side.

In order to achieve the above and other objects, an image display device of the present invention includes a display, an image sensor for converting an image of a subject into an image signal, a driver for driving the image sensor, signal processing sections, and a display controller. The signal processing sections process the image signal, and thereby concurrently producing plural image frames simulated based on different shooting conditions or different shooting modes. The display controller displays the images of these plural frames side by side on the display.

The shooting conditions or the shooting modes are designated by a designator. A selector selects one of the images displayed on the display. When a shutter is released, an image is recorded under the shooting condition or the shooting mode corresponding to the selected image.

The signal processing sections are at least first and second signal processing sections. The first signal processing section simulates an image frame based on a first shooting condition designated by the designator and the second signal processing section simulates an image frame based on a second shooting condition designated by the designator.

In a first embodiment of the present invention, the first shooting condition is a first shutter speed and the second shooting condition is a second shutter speed slower than the first shutter speed. The image signal obtained with the first shutter speed is input to the first and second signal processing sections to produce the frames.

When the frame rate of the image sensor is faster than a frame rate of the display, the first or second signal processing section preferably performs frame thinning to the image signal from the image sensor such that the frame rate of the image sensor corresponds to the frame rate of the display.

When a frame rate corresponding to the second shutter speed is slower than a frame rate of the display, the first or second signal processing section preferably performs frame adding to the image signal from the image sensor such that the frame rate of the image sensor corresponds to the frame rate of the display.

In a second embodiment of the present invention, the first shooting condition is a first aperture stop value and the second shooting condition is a second aperture stop value providing an aperture size larger than the first aperture stop value. The image signal obtained with the first aperture stop value is input to the first and second signal processing sections to produce the frames.

The second signal processing section includes a memory, a main subject extractor, and a filter processing circuit. Before producing the frames, the memory stores a first image captured with the first aperture stop value and a second image captured with the second aperture stop value. The main subject extractor extracts a main subject by comparing the first image with the second image. The filter processing circuit performs filter processing to a background region. The background region is a region excluding the main subject.

In a third embodiment of the present invention, the first shooting condition is a first exposure value providing correct exposure and the second shooting condition is a second exposure value increased or decreased by a predetermined exposure compensation value with respect to the first exposure value. The image signal obtained with the first exposure value is input to the first and second signal processing sections to produce the frames.

In a fourth embodiment of the present invention, the signal processing sections are at least first and second signal processing sections. The first signal processing section simulates an image frame based on a first shooting mode and the second signal processing section simulates an image frame based on a second shooting mode.

To produce the frames, the image signal is obtained with a large aperture stop value providing smallest aperture size and a high shutter speed providing fastest shutter speed among the shooting conditions of the first and second shooting modes. An ISO sensitivity is designated so as to provide correct exposure under the large aperture stop value and the high shutter speed. The obtained image signal is input to the first and second signal processing sections.

It is preferable that the first shooting mode is designated by the designator and the second shooting mode is a most frequently used mode among previously used shooting modes.

In a fifth embodiment of the present invention, the first shooting mode is a horizontal position shooting mode and the second shooting mode is a vertical position shooting mode. A light receiving surface of the image sensor has a substantially square shape. The first and second signal processing sections crop sides or top and bottom of an image of the subject.

An image display method of the present invention includes a converting step, a frame producing step, and a displaying step. In the converting step, an image of a subject is converted into an image signal. In the frame producing step, first and second image frames are simulated based on different shooting conditions or different shooting modes. In the displaying step, the images of the first and second frames are displayed side by side on a display. In the frame producing step, the first and second frames are produced concurrently.

The frame producing step includes at least one of a shutter priority mode, an aperture priority mode, an exposure compensation mode, a scene designation mode, and a camera posture designation mode.

According to the present invention, plural frames under various shooting conditions or shooting modes are concurrently produced, therefore the frames are produced quickly. In addition, since images of these plural frames are displayed side by side on the display, a desired shooting condition or shooting mode is appropriately selected.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
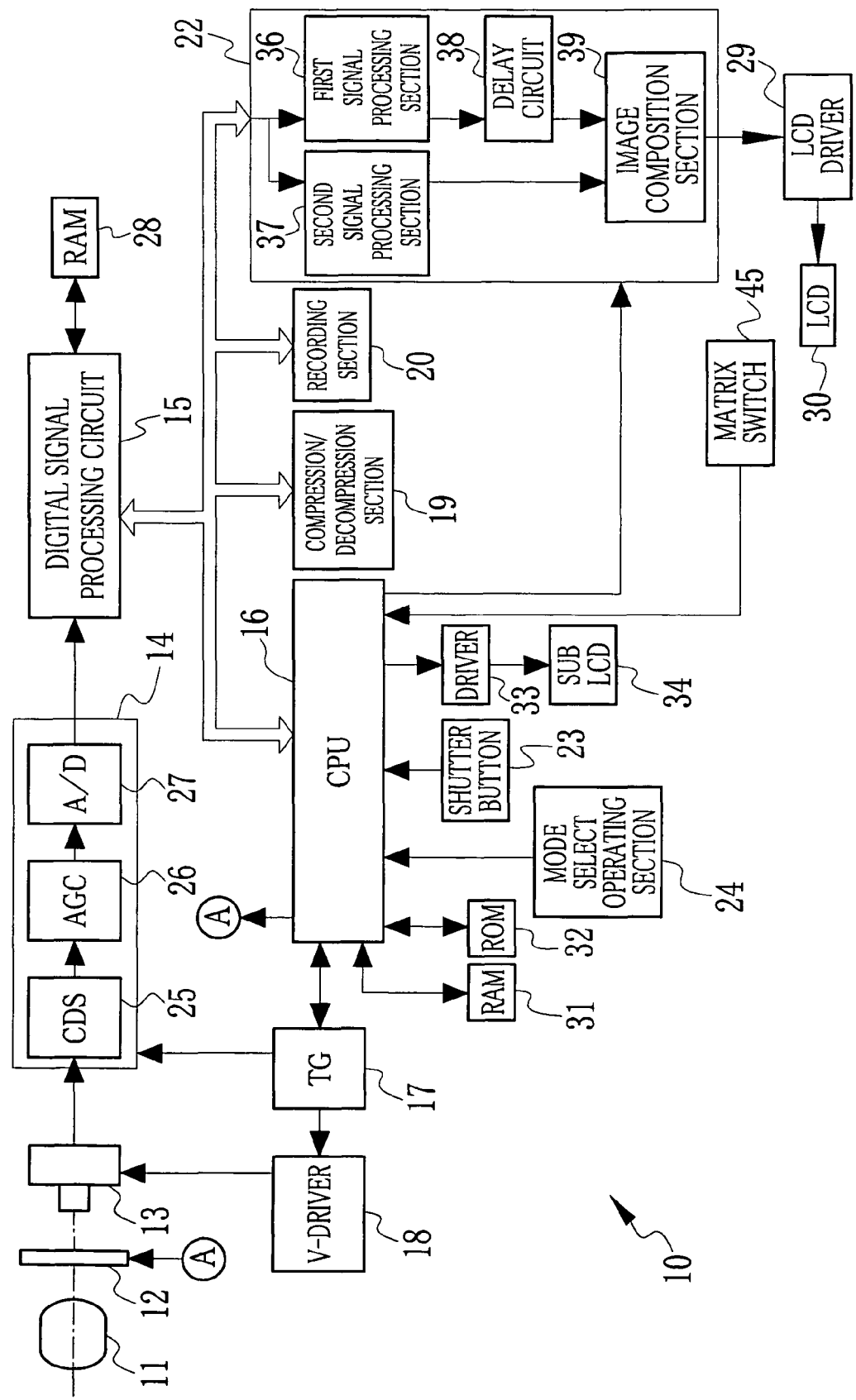
FIG. 1 is a block diagram showing a configuration of a digital camera.

In FIG. 1, a digital camera 10 includes a taking lens 11, a mechanical-shutter (shutter) 12 which also works as an aperture stop, an image sensor 13, an analogue front end (AFE) 14, a digital signal processing circuit 15, a CPU 16, a timing generator (TG) 17, V-driver 18, a compression/decompression section 19, a recording section 20, a display controller 22, a shutter button 23, a mode select operating section 24, and the like. Components not directly related to the present invention, such as a focus adjustment mechanism of the taking lens 11 and a power circuit, are not illustrated.

The AFE 14 is composed of a correlated double sampling circuit (CDS) 25, an automatic gain control amplifier (AGC) 26, and an A/D converter 27. RGB signals from the image sensor 13 are digitized in the AFE 14, and then sent to the digital signal processing circuit 15. The digital signal processing circuit 15 includes a Y/C separation circuit, an AE/AF circuit, a color correction circuit, and the like. As well known, the Y/C separation circuit separates the RGB signals into luminance signals and chrominance signals (hereinafter, referred to as image data). The AE/AF circuit calculates an exposure value according to a brightness of a subject and detects a focal point of a focus lens. The color correction circuit corrects color balance.

The image data from the digital signal processing circuit 15 is sent to the compression/decompression section 19 and encoded in a predetermined compression format herein. The recording section 20 records the encoded image data, as an image file, to a recording medium like a memory card. A gain of the AGC 26 is set by the CPU 16. The TG 17 supplies pulses to the AFE 14 and to the V-driver 18 and drive them synchronously.

During the framing which is performed before the shutter button 23 is fully pressed, the RGB signals are periodically read out from the image sensor 13 and converted into image data in the AFE 14. The image data is sent to a RAM 28 via the digital signal processing circuit 15. The AE/AF circuit of the digital signal processing circuit 15 extracts information about the subject brightness and sends the extracted information to the CPU 16. The CPU 16 calculates the exposure value based on the subject brightness information. According to the exposure value, an aperture stop diameter of the shutter 12 is controlled. In addition, charge storage time of the image sensor 13 is controlled according to a shutter speed, and the CPU 16 controls the gain amount of the AGC 26 according to white balance control amount.

The image data of single frame recorded in the RAM 28 is read out to the digital signal processing circuit 15 and subjected to image processing. After the image processing, the image data is converted into the data of the luminance signal and the chrominance signal by the Y/C separation circuit. This converted image data is sent to the display controller 22. In the display controller 22, an image simulated based on a set shooting condition (standard image) and an image simulated based on a changed shooting condition (comparative image) are produced. The standard image or the comparative image is sent to a LCD 30 via an LCD driver 29.

In a normal display mode, only the standard image is displayed large on a screen 30a (see FIG. 3) of the LCD 30. In a check display mode, the standard image and the comparative image are displayed small on the screen 30a side by side. The standard image and the comparative image are so called through images displayed in real time during the framing. The LCD 30 is provided on a rear surface of a camera body and its screen 30a is horizontally long.

A RAM 31 as a work memory and a ROM 32 in which various programs are preliminary stored are connected to the CPU 16. The mode select operating section 24 is used for changing the shooting condition and selecting the shooting mode.

The shutter button 23 and the mode select operating section 24 are respectively connected to the CPU 16. The CPU 16 takes overall control of each component of the digital camera 10. When the shutter button 23 is pressed halfway, the CPU 16 moves the focus lens of the taking lens 11 and finds lens position providing maximum contrast by the AE/AF circuit of the digital signal processing circuit 15. The CPU 16 then sets the focus lens in this lens position. The CPU 16 calculates the exposure value according to the subject brightness from the AE/AF circuit, and determines the aperture stop value and the shutter speed based on the calculated exposure value. According to the aperture stop value, the CPU 16 controls the aperture stop diameter of the shutter 12. When the shutter button 23 is fully pressed for recording an image, the CPU 16 controls exposure time of the image sensor 13 with the determined shutter speed. An image captured with the image sensor 13 is subjected to the image processing and recorded in the memory card. After the image recording, the LCD 30 returns to display through images for framing.

[First Embodiment]

A first embodiment shows a shutter priority mode. An image simulating a frame at a first shutter speed and an image simulating a frame at a second shutter speed are displayed on the screen 30a of the LCD 30 side by side. Owing to this, movement and impression of the subject due to shutter speed difference can be checked before recording an image.

Figure 2:
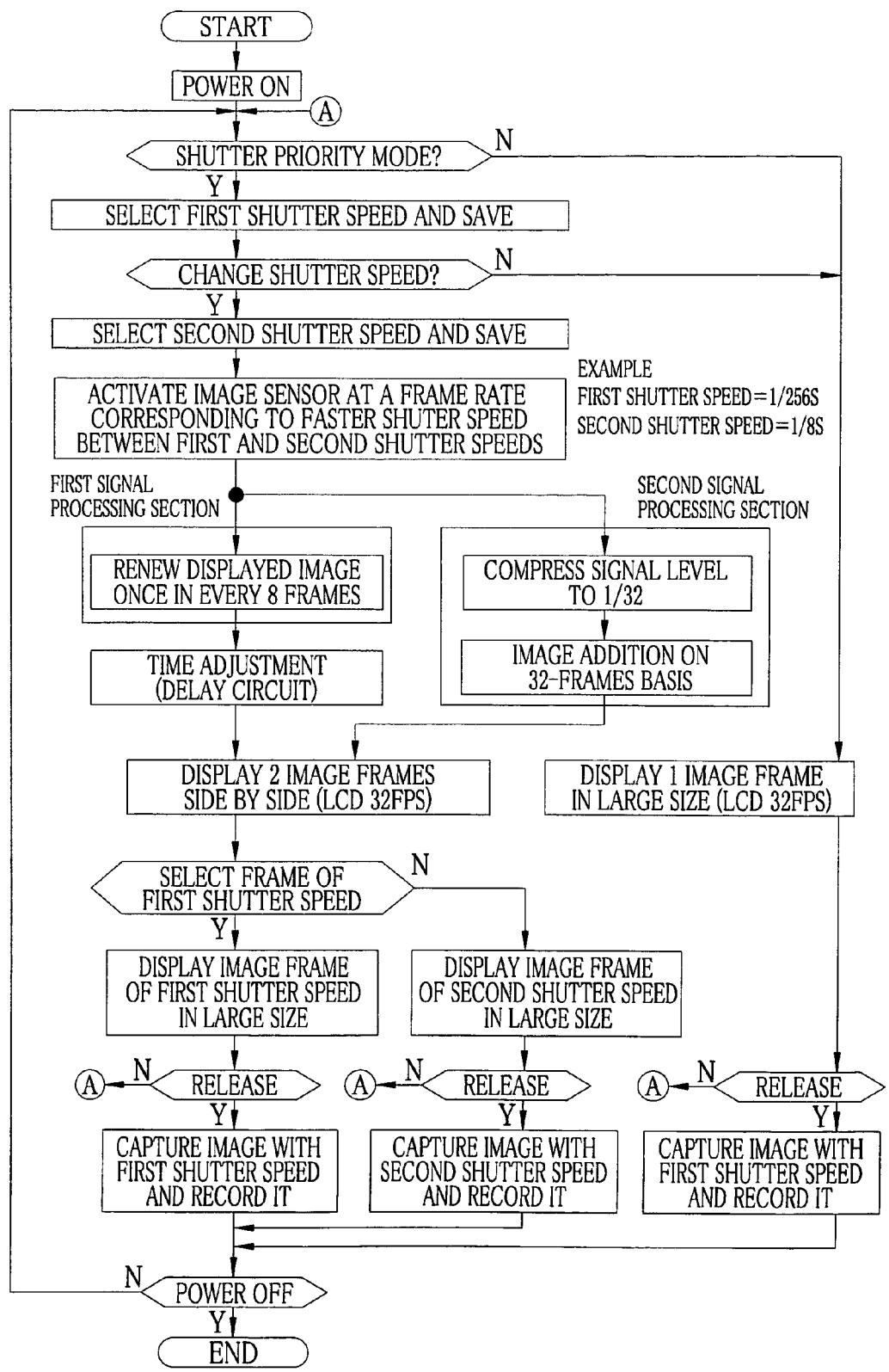
FIG. 2 is a flow chart showing a first embodiment of the present invention in which plural image frames with different shutter speeds are displayed side by side.

In response to the selection of the shutter priority mode, the CPU 16 displays an operation window for designating the first shutter speed and the second shutter speed on a sub LCD 34 via a driver 33. The sub LCD 34 is provided on, for example, a top surface of the camera body. As shown in FIG. 2, the shutter priority mode is selected after the power is turned on. The operation window for designating the first shutter speed is displayed on the sub LCD 34. When the first shutter speed is designated, the value is saved in the RAM 31. Next, a menu that asks if the shutter speed is to be changed or not is displayed on the sub LCD 34. When "YES (CHANGE)" is selected, the LCD 30 is set to the check display mode showing two image frames side by side. When "NO (DO NOT CHANGE)" is selected, the LCD 30 is set to the normal display mode showing one image frame large, and an image is captured with the first shutter speed.

When "YES (CHANGE)" is selected, an operation window for designating the second shutter speed is displayed on the sub LCD 34. When the second shutter speed is designated, the value is saved in the RAM 31. When designating two different shutter speeds (first and second shutter speeds), the CPU 16 activates the image sensor 13 at a frame rate corresponding to the faster shutter speed between the first and second shutter speeds. For example, when the first shutter speed is "1/256 sec" and the second shutter speed is "1/8 sec", the image sensor 13 is activated at the frame rate of "256 fps" during the framing.

The display controller 22 is constituted of a first signal processing section 36, a second signal processing section 37, a delay circuit 38, and an image composition section 39. These components are controlled by the CPU 16. During the framing, the image data from the digital signal processing circuit 15 is input to the first and second signal processing sections 36 and 37 respectively. The first signal processing section 36 produces an image simulating a frame at the faster shutter speed, and the second signal processing section 37 produces an image simulating a frame at the slower shutter speed.

The image composition section 39 reduces the two images and merges them. In this embodiment, the images are reduced to a size that multiple, for example, two images can be displayed side by side horizontally on the screen 30a of the LCD 30. The merged image is sent to the LCD 30 via the LCD driver 29. On the screen 30a of the LCD 30, an image 40 produced in the first signal processing section 36 and an image 41 produced in the second signal processing section 37 are displayed side by side during the framing, as shown in FIG. 3.

Figure 4:
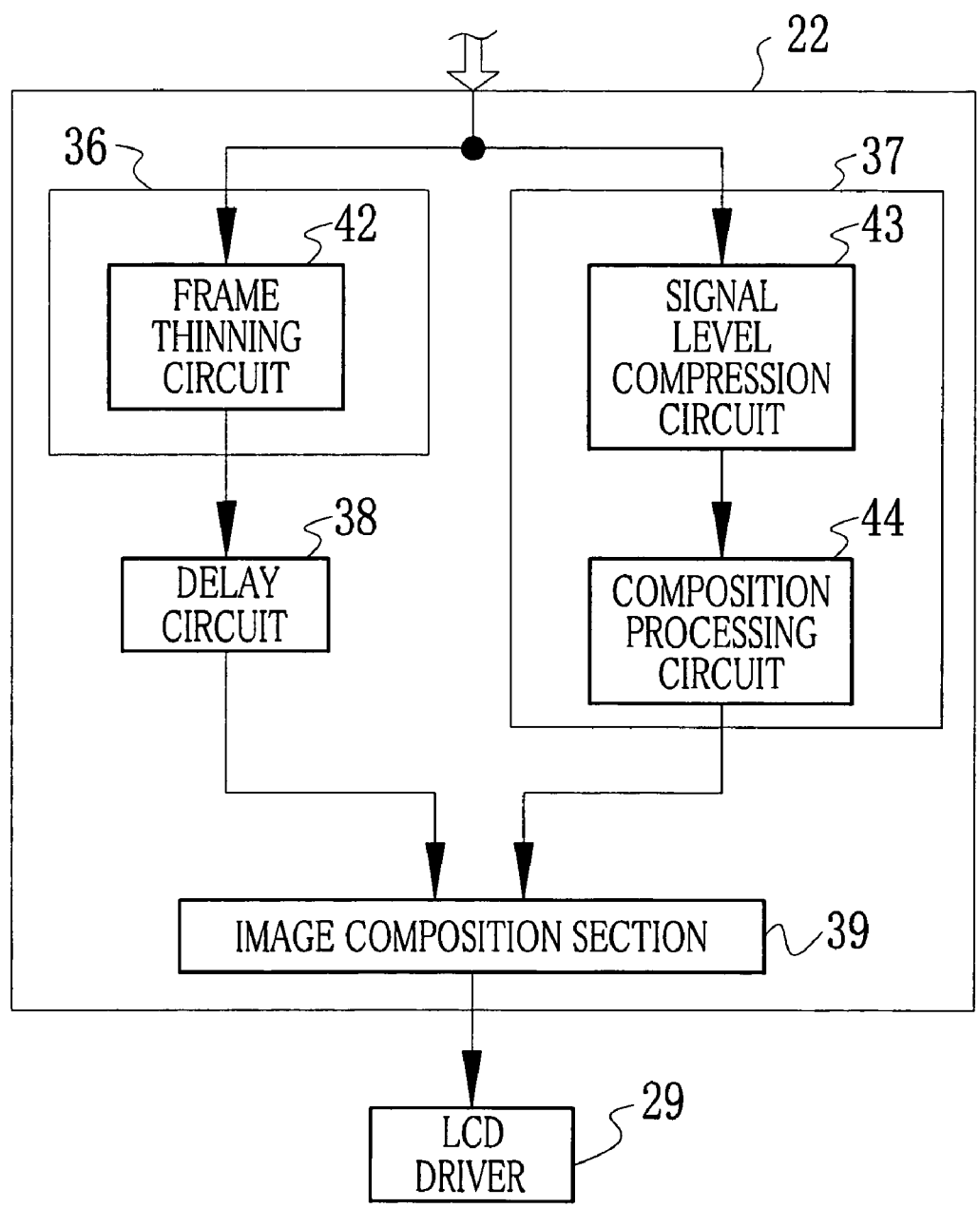
FIG. 4 is a block diagram showing a configuration of a display controller.

As shown in FIG. 4, the first signal processing section 36 has a frame thinning circuit 42 and applies frame thinning processing to original image data to have a frame rate same as the LCD 30. For example, when the frame rate of the original image data is "256 fps" and the frame rate of the LCD driver 29 for driving the LCD 30 is "32 fps", one out of every 8 frames (every eighth frame) (8=256/32) is extracted in accordance with the frame rate of the LCD 30. An image of the first frame of the original image data is displayed for a time corresponding to the time displaying 8 frames, and then an image of ninth frame is displayed for a time corresponding to the time displaying 8 frames. An image of every eighth frame is renewed and displayed by repeating this processing. When the frame rate of the image sensor 13 is faster than the frame rate of the LCD 30 like the above case, the frame thinning processing is applied so that the images are produced at the same frame rate as the LCD 30. Owing to this, images with no subject blurred can be displayed as the through images during the framing.

The second signal processing section 37 has a signal level compression circuit 43 and a composition processing circuit 44 and performs image processing to produce a frame at the slower shutter speed. The composition processing circuit 44 performs frame adding processing to obtain a frame at the slower shutter speed. Thereby, the frame with the subject blurred, if the subject is moving, can be obtained. For example, when the second shutter speed is "⅛ sec", the frame rate corresponding to this shutter speed is "8 fps". Since the frame rate of the original image data is "256 fps", an image needs to be produced once in every 32 frames (every thirty-second frame) (32=256/8). Therefore, an image is added on a 32-frames basis. That is, 8 frames are produced in one second and a frame is renewed in every ⅛ second. Here, the signal level of the original image data is compressed to "1/32" in the signal level compression circuit 43 before the composition processing because high signal level of the image data slows down the composition processing. When the frame rate corresponding to the slower shutter speed is slower than the frame rate of the LCD 30 like the above case, the frame adding processing is applied so that the images are produced at the same frame rate as the LCD 30. Owing to this, images with subject blurred can be obtained. The processing time of the second signal processing section 37 may take longer than the processing time of the first signal processing section 36, therefore the delay circuit 38 is provided after the first signal processing section 36. Owing to this delay circuit 38, two images can be simultaneously input to the image composition section 39.

Figure 3:
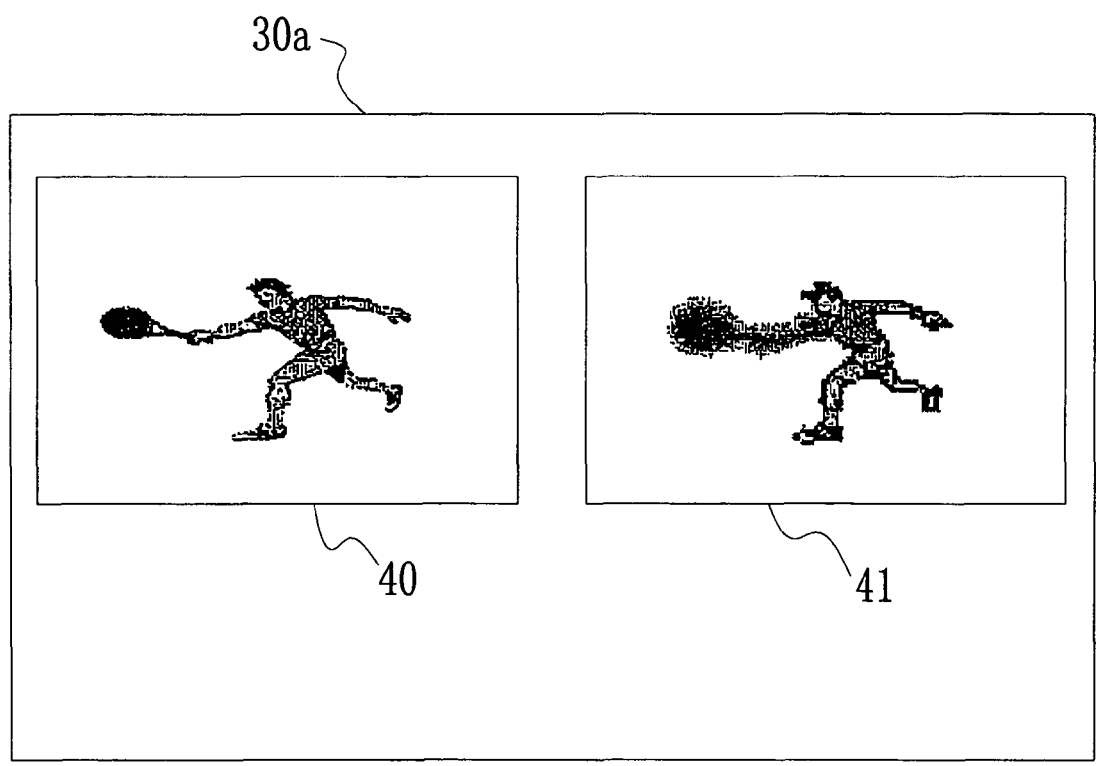
FIG. 3 is an explanatory view showing images displayed on a screen.

As shown in FIG. 3, two images 40 and 41 are displayed side by side on the screen 30a of the LCD 30 during the framing. The image 40 simulates a frame at a high-shutter speed and the image 41 simulates a frame at a low-shutter speed. Owing to this, the recording effect by changing the shutter speeds can be checked in advance. When one image frame is displayed on the screen 30a (normal display mode), the frame produced by the first signal processing section 36 or the second signal processing section 37 is directly sent to the LCD driver 29 without being reduced in the image composition section 39.

The LCD 30 is a touch panel having a matrix switch 45 incorporated. The matrix switch 45 is connected to the CPU 16. When receiving a signal from the matrix switch 45, the CPU 16 recognizes which one of the images 40 and 41 is touched. The CPU 16 then selects the shutter speed corresponding to the selected image as well as switching the LCD 30 to the normal display mode and displays the selected image in full-size on the screen 30a. When the shutter is released after that, an aperture stop value providing a correct exposure under the shutter speed corresponding to the selected image is determined, and an image is recorded under this exposure condition. The obtained image is subjected to the image processing and then saved in the memory card and the like via the recording section 20.

In the first embodiment, the configurations of the first and second signal processing sections 36 and 37 are different. However, it is possible that both of them have the same configuration including the frame thinning circuit 42, the signal level compression circuit 43, and the composition processing circuit 44 but have the different parameters of each circuit determined based on the shutter speed.

In the first embodiment, two images corresponding to two kinds of shutter speeds are displayed side by side. It is also possible that three images corresponding to three kinds of shutter speeds are displayed side by side. In this case, same numbers of the signal processing sections as the kinds of the shutter speeds need to be provided.

When a super low-shutter speed is designated, moving subject may disappear from the image after the frame adding processing by the second signal processing section 37. In this case, the image processing can be performed such that only the moving subject is emphasized and displayed. For example, a cropping section and an emphasis display section are provided to the second signal processing section 37. When a predetermined super low-shutter speed is selected, the second signal processing section 37 simulates a frame captured at a shutter speed that is slowest extent possible to describe the moving subject, for example, at ⅛ sec. The moving subject is cropped from the simulated frame and displayed with emphasis on the LCD 30. As the emphasis display, for example, the moving subject is blinked or is displayed in different color.

[Second Embodiment]

Figure 5:
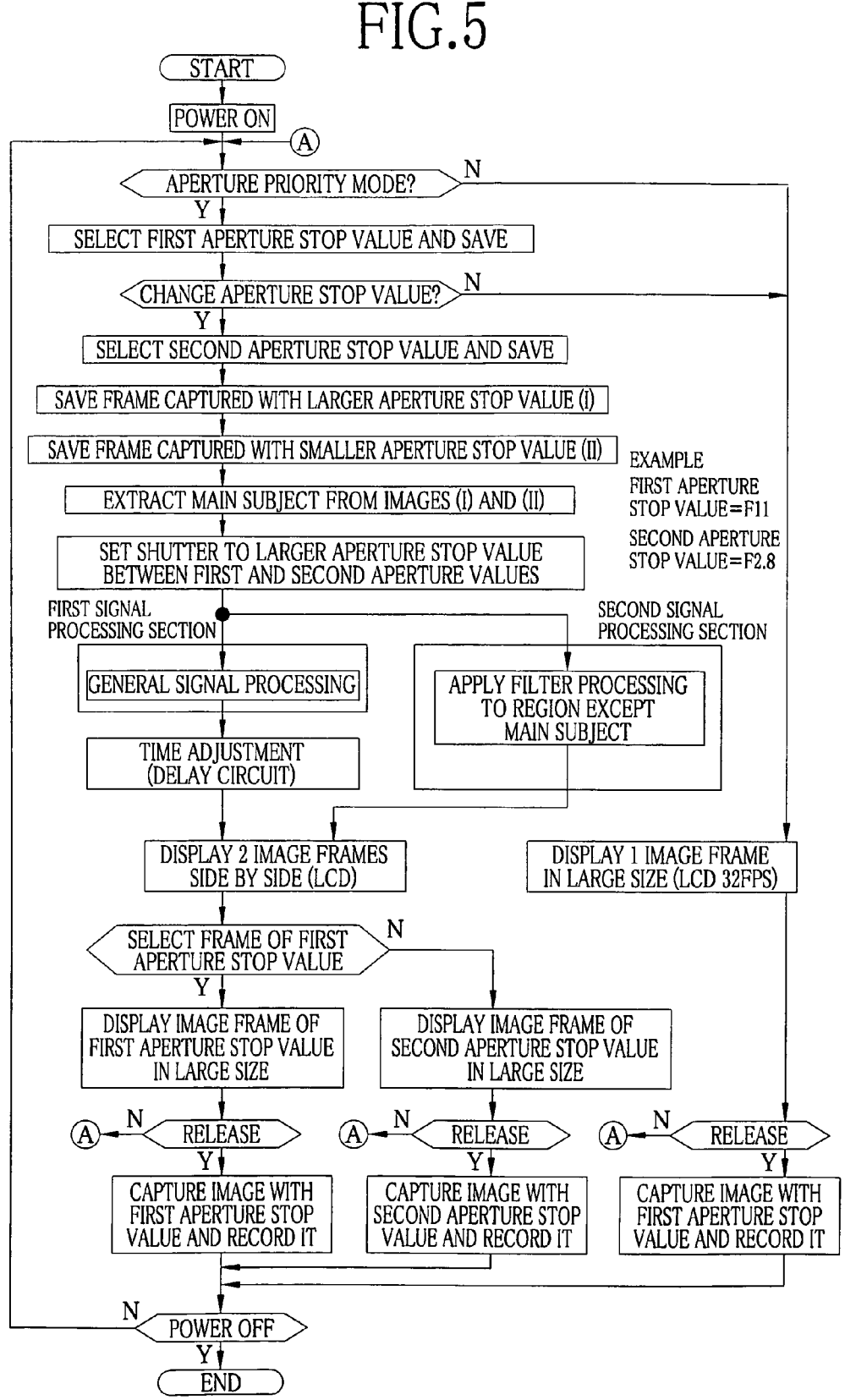
FIG. 5 is a flow chart showing a second embodiment of the present invention in which plural image frames with different aperture stop values are displayed side by side.

A second embodiment shows an aperture priority mode. A plurality of image frames with different aperture stop values is displayed side by side. When the aperture priority mode is selected, the CPU 16 displays an operation window for designating, for example, first and second aperture stop values is displayed on the sub LCD 34. As shown in FIG. 5, the aperture priority mode is selected and the operation window for designating the first aperture stop value is displayed on the sub LCD 34. When the first aperture stop value is designated, the value is saved in the RAM 31. Next, a menu that asks if the aperture stop value is to be changed or not is displayed on the sub LCD 34. When "YES (CHANGE)" is selected, the LCD 30 is set to the check display mode showing plural image frames side by side. When "NO (DO NOT CHANGE)" is selected, the LCD 30 is set to the normal display mode showing one image frame large.

When "YES (CHANGE)" is selected, an operation window for designating the second aperture stop value is displayed on the sub LCD 34. When the second aperture stop value is designated, the value is saved in the RAM 31. Here, the first aperture stop value is "f11" (large aperture stop value) and the second aperture stop value is "f2.8" (small aperture stop value).

Figure 6:
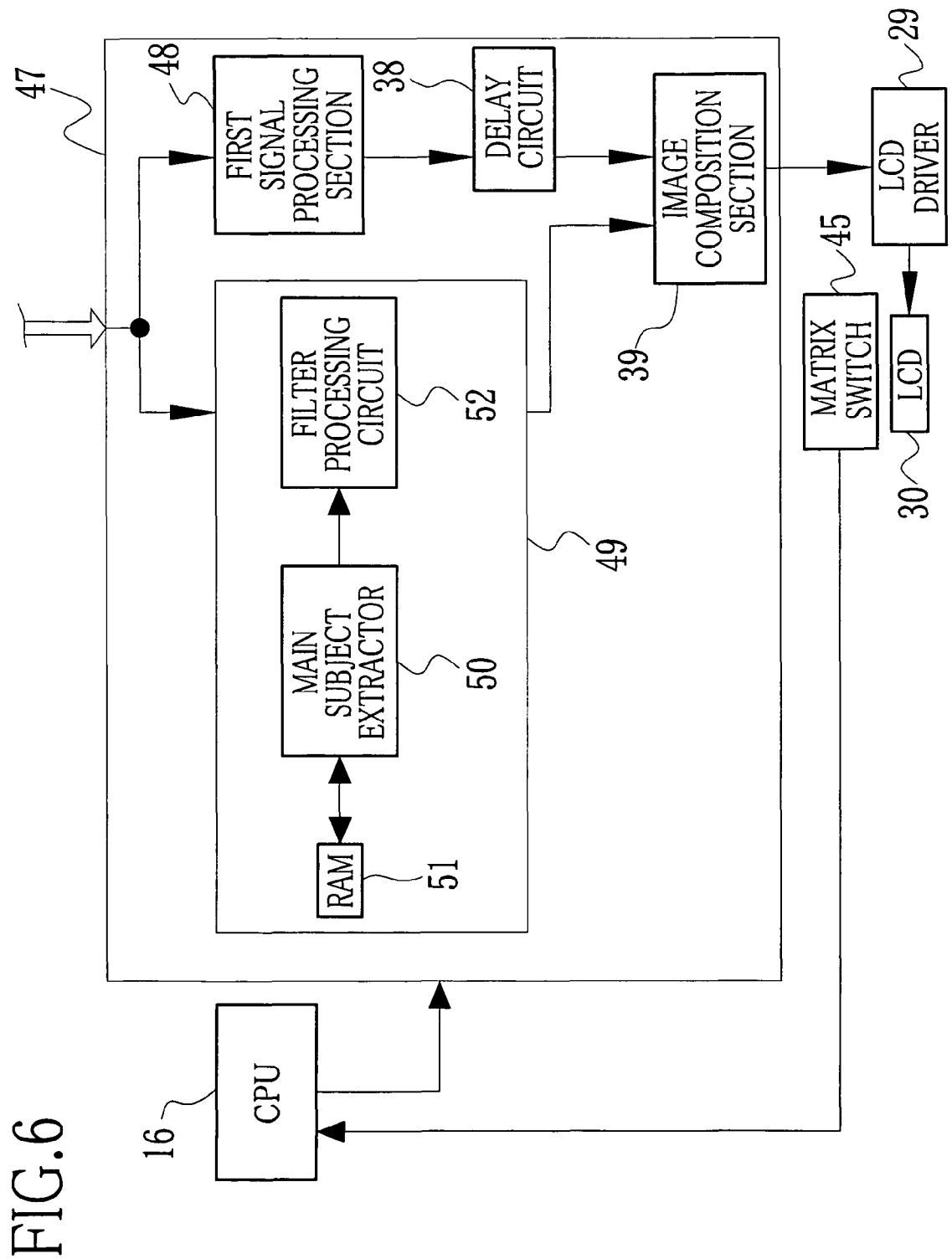
FIG. 6 is a block diagram showing a configuration of a display controller according to the second embodiment.

As shown in FIG. 6, a display controller 47 is provided with first and second signal processing sections 48 and 49, the delay circuit 38, and the image composition section 39. The first signal processing section 48 produces an image simulating a frame captured with the large aperture stop value, and the second image processing section 49 produces an image simulating a frame captured with the small aperture stop value. The second image processing section 49 includes a main subject extractor 50, a RAM 51, and a filter processing circuit 52. The first and second signal processing sections 48 and 49 are controlled by the CPU 16.

When two kinds of aperture stop values are designated, the CPU 16 adjusts the shutter 12 to have the larger aperture stop value between the two. Image data of one frame obtained under such condition (first image data) is stored in the RAM 51. Next, the CPU 16 adjusts the shutter 12 to have the smaller aperture stop value. Image data of one frame obtained under such condition (second image data) is stored in the RAM 51. The main subject extractor 50 compares the two images stored in the RAM 51 and judges a region with few changes in contour components as a main subject. The main subject extractor 50 also designates a region excluding the main subject to be subjected to front and rear blur. The information is sent to the filter processing circuit 52. Instead of this, it is also possible to extract a region with many changes in contour components to be blurred.

After extracting the region of the main subject, the shutter 12 is adjusted to have the larger aperture stop value. Original image data obtained under such condition is sent to the first signal processing section 48 but sent out as it is since the image is captured with the larger aperture stop value.

In the second signal processing section 49, the region excluding the main subject, that is, the blur region is subjected to the filter processing. The filter processing is performed using a low pass filter. It is also possible to use a filter produced based on weighted average between pixels to be blurred and its surrounding pixels. Owing to this, an image with blurred background and the like is obtained by the second signal processing section 49. The second signal processing section 49 takes time for the processing, therefore the delay circuit 38 is provided after the first signal processing section 48.

Figure 7:
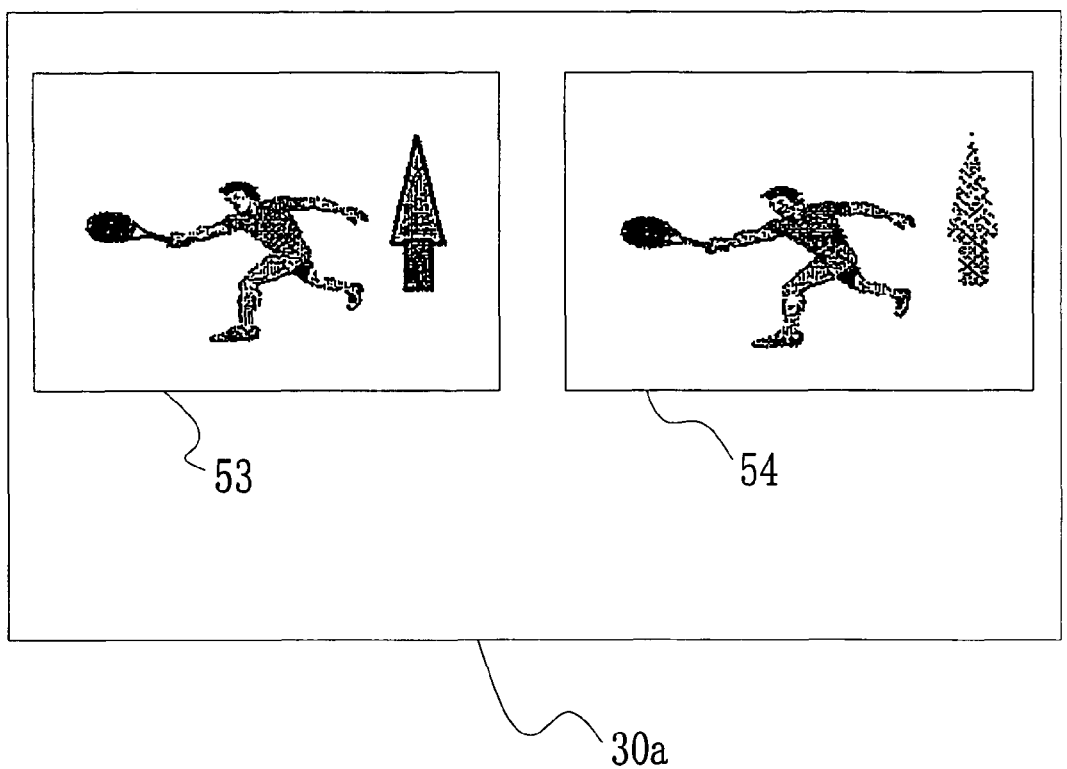
FIG. 7 is an explanatory view showing images displayed on the screen.

As shown in FIG. 7, an image 53 simulating a frame captured with the small aperture stop value and an image 54 simulating a frame captured with the large aperture stop value are displayed side by side on the screen 30a of the LCD 30 during the framing. Owing to this, it is possible to check the degree of subject blur between short distance and long distance when changing the aperture stop values in advance of recording an image.

The two images 53 and 54 displayed on the screen 30a of the LCD 30 are observed and a desired one is selected by touching the image. When the image 53 is selected, for example, the image 53 is displayed large on the screen 30a. When the shutter button 23 is pressed after the framing, a shutter speed providing a correct exposure under the aperture stop value corresponding to the selected image 53 is determined, and an image is recorded under this exposure condition. The obtained image is subjected to the image processing and then saved in the memory card and the like via the recording section 20.

It is also possible that both of the first and second signal processing sections 48 and 49 have the same configuration. In this case, the signal processing section that produces a frame captured with the smaller aperture stop value sends out the input frame as it is. In addition, it is also possible to provide three or more of the image signal processing sections and display three or more images corresponding to three or more kinds of aperture stop values side by side.

[Third Embodiment]

A third embodiment shows an AEB shooting mode (exposure compensation mode) for simulating a plurality of image frames with different exposure values. When an exposure shift amount (exposure compensation amount) and an exposure step (number of step for exposure compensation) are input, an image simulating a frame captured with a correct exposure value, an image simulating a frame shifted for "+1" step from the aforesaid correct exposure value, and an image simulating a frame shifted for "+2" step from the aforesaid correct exposure value are displayed on the LCD 30 side by side.

Figure 8:
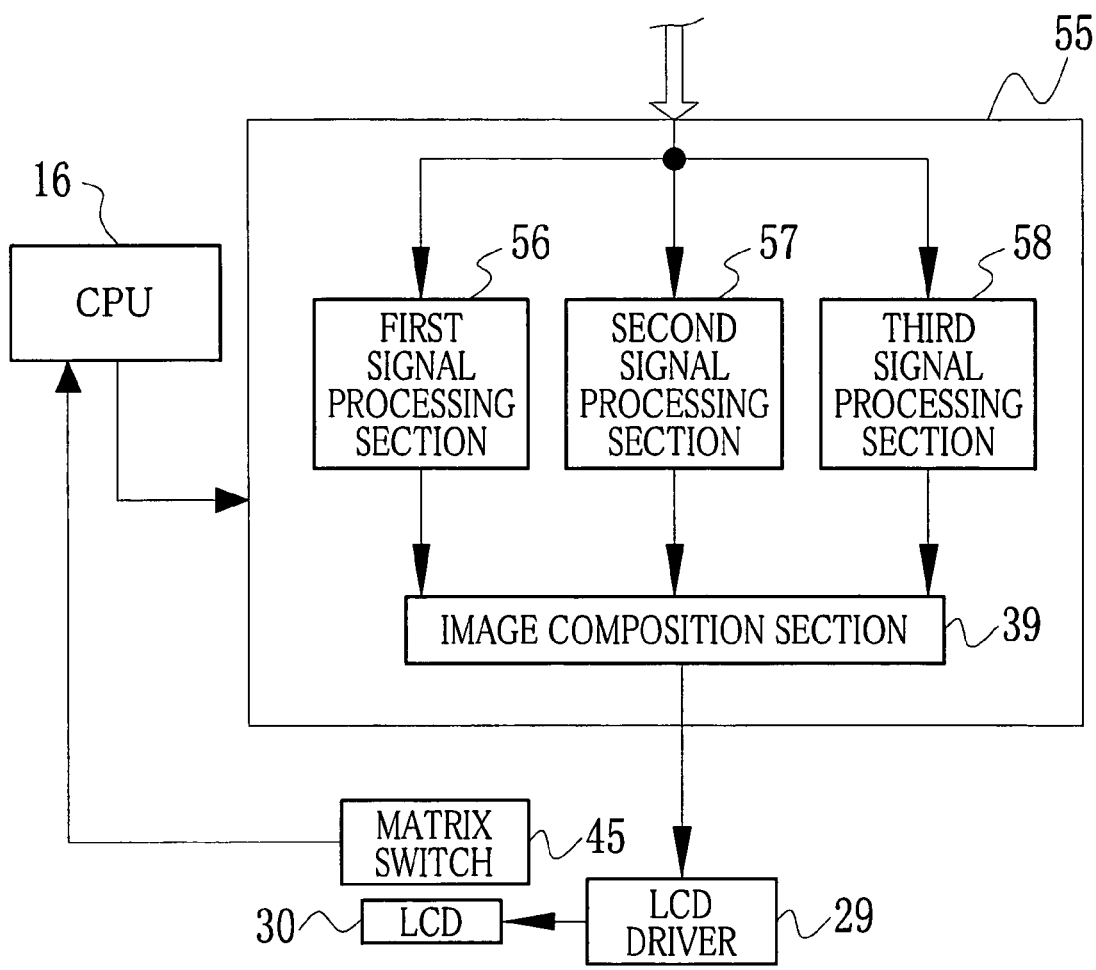
FIG. 8 is a block diagram showing a display controller according to a third embodiment in which plural image frames with different exposure values are displayed side by side.

As shown in FIG. 8, a display controller 55 is provided with first, second and third signal processing sections 56, 57, and 58. Original image data is sent to the first to third signal processing sections 56 to 58 respectively. The first signal processing section 56 produces an image simulating a frame captured with a correct exposure value. The second signal processing section 57 produces an image simulating a frame with exposure compensation for "+1 EV" with respect to the correct exposure value. The third signal processing section 58 produces an image simulating a frame with exposure compensation for "+2 EV" with respect to the correct exposure value. The first to third signal processing sections 56 to 58 are controlled by the CPU 16. When the exposure shift amount is set to "0 EV", that is, "none", the image captured with the correct exposure value is sent out as it is.

Figure 9:
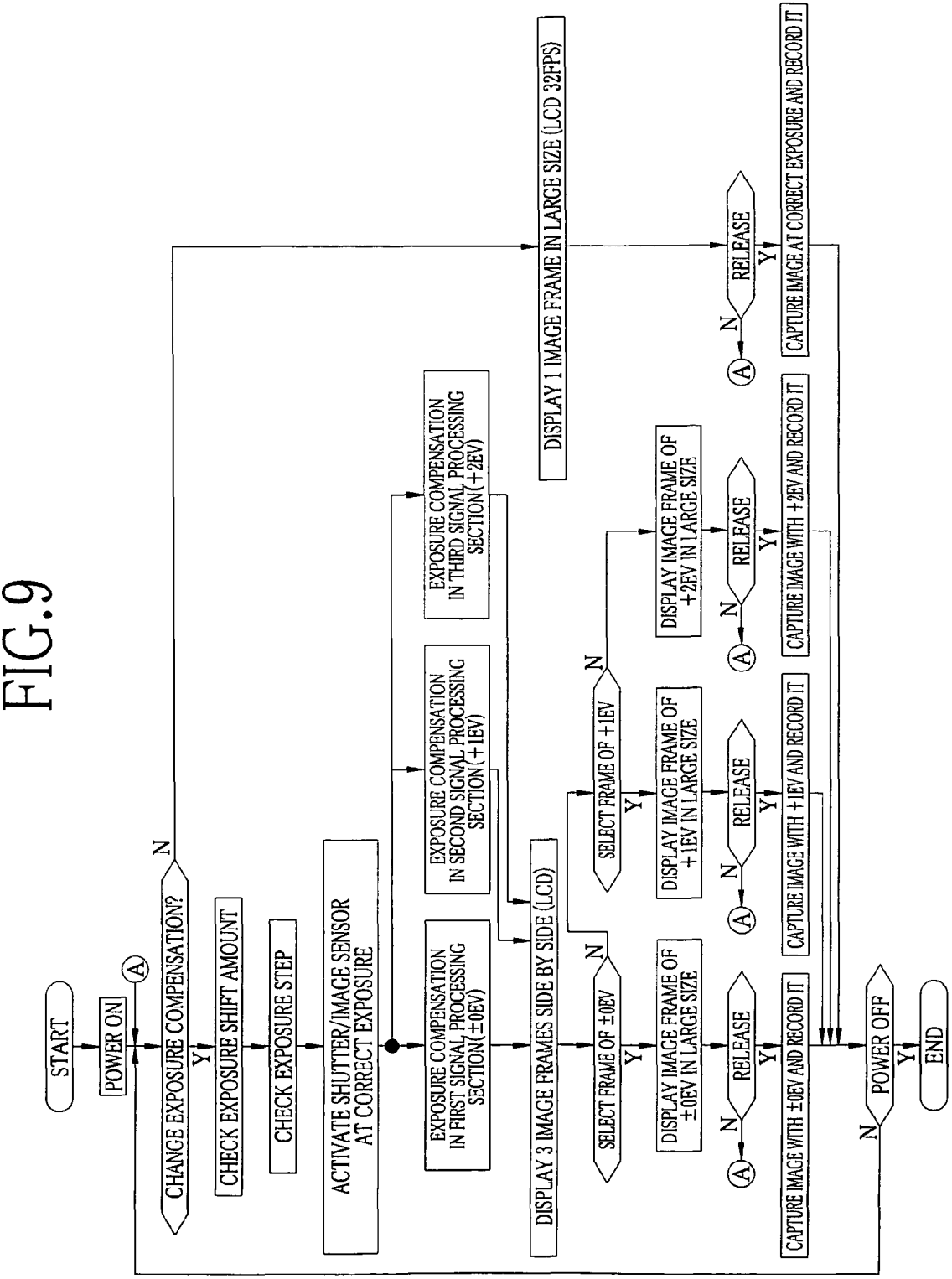
FIG. 9 is a flow chart showing the third embodiment.

As shown in FIG. 9, when the exposure compensation mode is selected and change of exposure value is designated, an operation window for inputting an exposure shift amount is displayed on the sub LCD 34. When the exposure shift amount is input, an operation window for inputting an exposure step is displayed. When the exposure step is input, the LCD 30 is set to the check display mode. In this embodiment, for example, the exposure shift amount is set to "+1 EV" and the exposure step is set to "±1 EV".

Figure 10A:
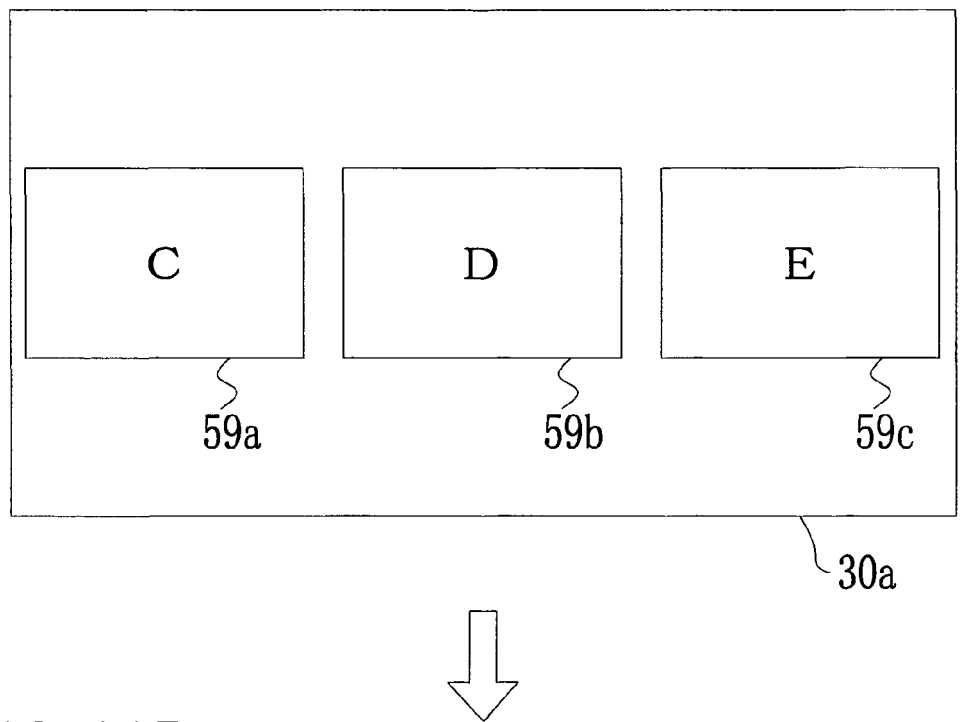
FIGS. 10A and 10B are explanatory views showing images displayed on the screen in which an exposure step is changed by touching each image.

Owing to this, since the exposure compensation amount is "±0 EV" in the first signal processing section 56, the original image (image with the correct exposure value) is sent out as it is. Since the exposure compensation amount is "+1 EV" in the second signal processing section 57, an image simulating a frame captured with the exposure compensation for "+1 EV" with respect to the correct exposure value is output therefrom. Since the exposure compensation amount is "+2 EV" in the third signal processing section 58, an image simulating a frame captured with the exposure compensation for "+2 EV" with respect to the correct exposure value is output therefrom. The images output from the first to third signal processing section 56 to 58 are subjected to the image processing by the image composition section 39, and then sent to the LCD driver 29. As shown in FIG. 10A, three images 59a, 59b, and 59c with different brightness are displayed on the screen 30a of the LCD 30 side by side.

When one of the images 59a to 59c displayed on the screen 30a is touched, the touched image is selected, and the selected image is displayed large on the screen 30a of the LCD 30. When the shutter button 23 is pressed after that, the shutter 12 is controlled according to the exposure value of the selected image and an image is recorded.

Figure 10B:
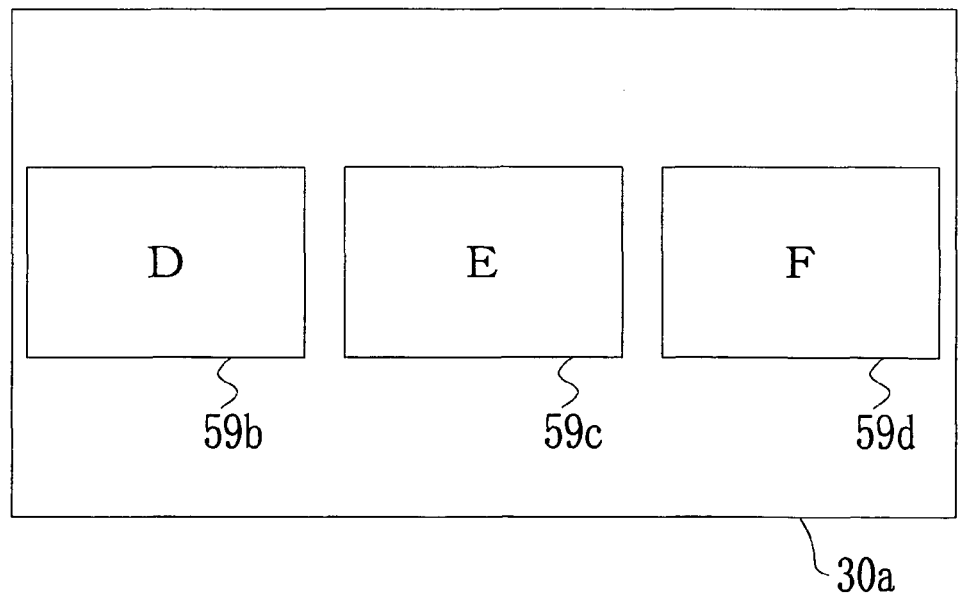

The exposure amount is not necessary input. When omitting the input of the exposure amount, one of the images 59a to 59c displayed on the screen 30a of the LCD 30 is firstly touched. Then, the touched image is displayed in the center of the screen 30a. Based on the exposure value of this touched image, images with the exposure values shifted are displayed both sides thereof. For example, when the image 59c with exposure value E shown in FIG. 10A is touched, the image 59c is displayed in the center of the screen as shown in FIG. 10B. Then, the image 59b and an image 59d with exposure compensation by the amount of exposure step are displayed both sides of the image 59c.

An image displayed in the center as the image 59c is produced in the second signal processing section 57, an image displayed on the left side as the image 59b is produced in the first signal processing section 56, and an image displayed on the right side as the image 59d is produced in the third signal processing section 58.

In the third embodiment, three images with three steps (kinds) of exposure values are displayed side by side. It is also possible that the exposure values have two steps, or four or more steps. In this case, same numbers of the signal processing sections as the steps of the exposure values need to be provided. It is also possible that an image with the exposure compensation value "0 EV" is displayed in the center and images with negative (−) and positive (+) compensations, for example, "−1 EV" and "+1 EV" are respectively displayed next to the image displayed in the center.

It is also possible that a plurality of correctly exposed images is displayed on the screen 30a side by side, and each image can be brighten or darken by changing the transmittance rate of pixels of the LCD or by changing the brightness of backlight higher or lower, by the exposure compensation amount with respect to the correct exposure value. For this configuration, the first to third signal processing sections can be omitted.

[Fourth Embodiment]

According to a fourth embodiment, a plurality of image frames corresponding to different scene modes is simulated and displayed. In the scene mode, exposure factors such as the aperture stop value, shutter speed, ISO sensitivity are automatically set so as to provide optimal shooting condition according to the feature of each scene. As the scene, there are, for example, landscape scene, sports scene, portrait scene and the like.

In landscape mode, an f-number is set small so that the details of the scenery can be described clearly. In sports mode, the ISO sensitivity is set high to prevent an image from blurring, and the shutter speed is set fast to compensate for the high ISO sensitivity. In portrait mode, the f-number is made large so that the background of the main subject becomes unsharp.

Figure 11:
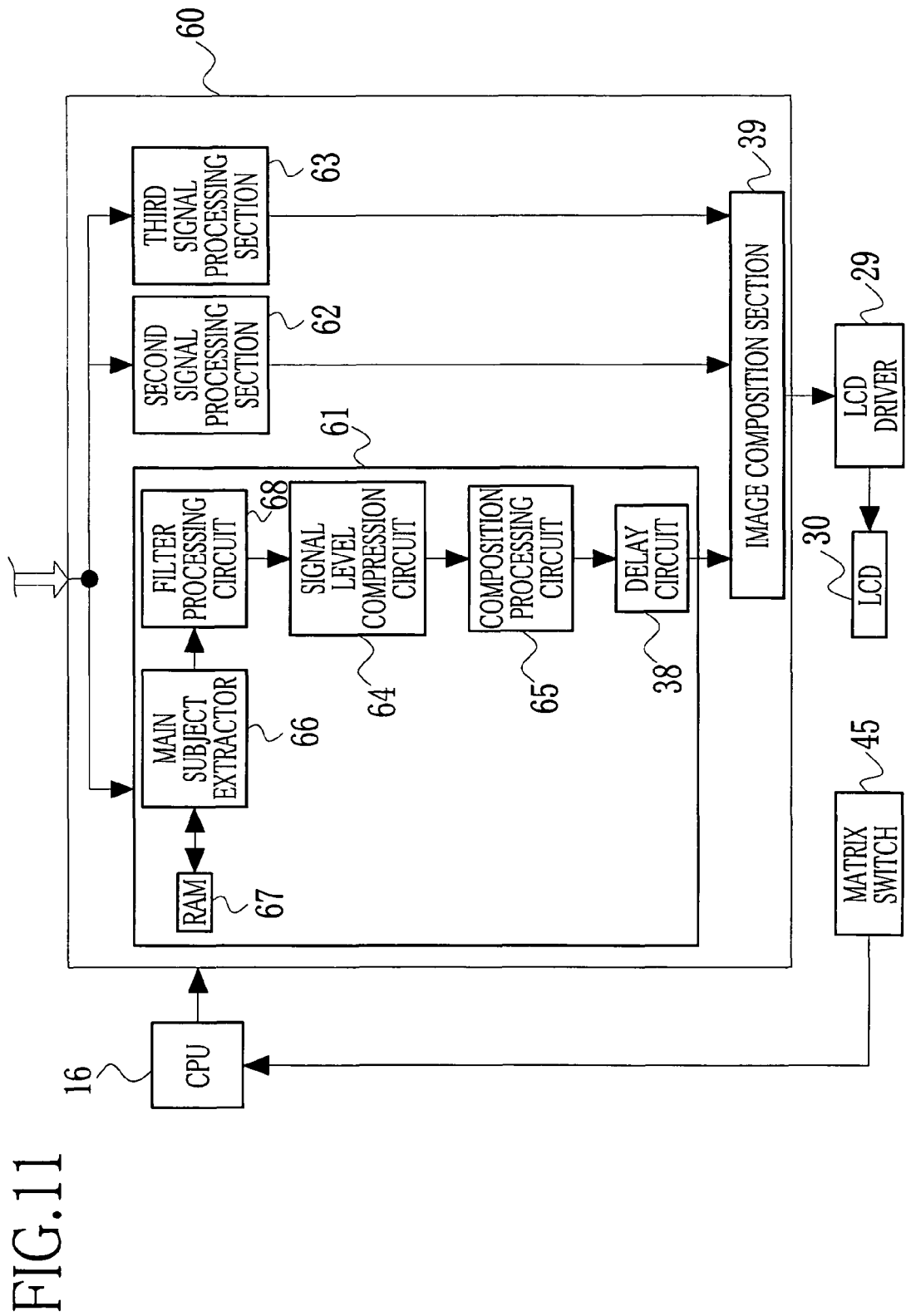
FIG. 11 is a block diagram showing a display controller according to a fourth embodiment in which plural image frames with different scene modes are displayed side by side.

In the fourth embodiment, the mode select operating section 24 (see FIG. 1) selects three scenes from preliminary prepared scene modes. As shown in FIG. 11, a display controller 60 is provided with first, second and third signal processing sections 61, 62 and 63 corresponding to the three scene modes. The CPU 16 allocates one of the scene modes to each signal processing section to execute the image processing corresponding to the scene mode.

The first signal processing section 61 produces a first image displayed on the left side of the screen 30a of the LCD 30. The second signal processing section 62 produces a second image displayed in the center of the screen 30a. The third signal processing section 63 produces a third image displayed on the right side of the screen 30a. The images from the first to third image processing sections 61 to 63 are merged in the image composition section 39, and then the three images are displayed on the screen 30a side by side.

The CPU 16 decides the shooting condition for the framing based on the three different scene modes. As the shooting condition, the largest aperture stop value and the fastest shutter speed among the three kinds of scene modes are selected. Then, the ISO sensitivity is adjusted such that a correct exposure is provided under the selected aperture stop value and shutter speed. According to this ISO sensitivity, a gain of an amplifier for amplifying the image signal is adjusted.

The first signal processing section 61 is constituted of a signal level compression circuit 64, a composition processing circuit 65, a main subject extractor 66, a RAM 67, and a filter processing circuit 68. As explained in the first embodiment, the composition processing circuit 65 produces a frame with the main subject blurred by adding plural frames. Thereby, an image simulating a frame captured with a shutter speed slower than the presently selected shutter speed is produced. In this case, the signal level of the original image data is compressed in the signal level compression circuit 64 because high signal level of the image data slows down the composition processing.

As explained in the second embodiment, the main subject extractor 66, the RAM 67, and the filter processing circuit 68 take two frames captured with the large aperture stop value and the small aperture stop value into the RAM 67. As mentioned above, the main subject extractor 66 extracts the main subject by comparing these two frames. The filter processing circuit 68 applies the filter processing to the blur region that is excluding the main subject, and thereby producing an image with blurred background.

The first to third signal processing sections 61 to 63 are not designed to correspond to the particular scene modes but can produce an image corresponding to the scene designated by the CPU 16. Accordingly, the second and third signal processing sections 62 and 63 have the same configuration as the first signal processing section 61. Three kinds of scene modes are respectively allocated to the first to third signal processing sections 61 to 63, and thereby producing three frames corresponding to the respective scene modes. Each of the first to third signal processing sections 61 to 63 is provided with the delay circuit 38. Owing to this, three images are simultaneously input to the image composition section 39.

Figure 12:
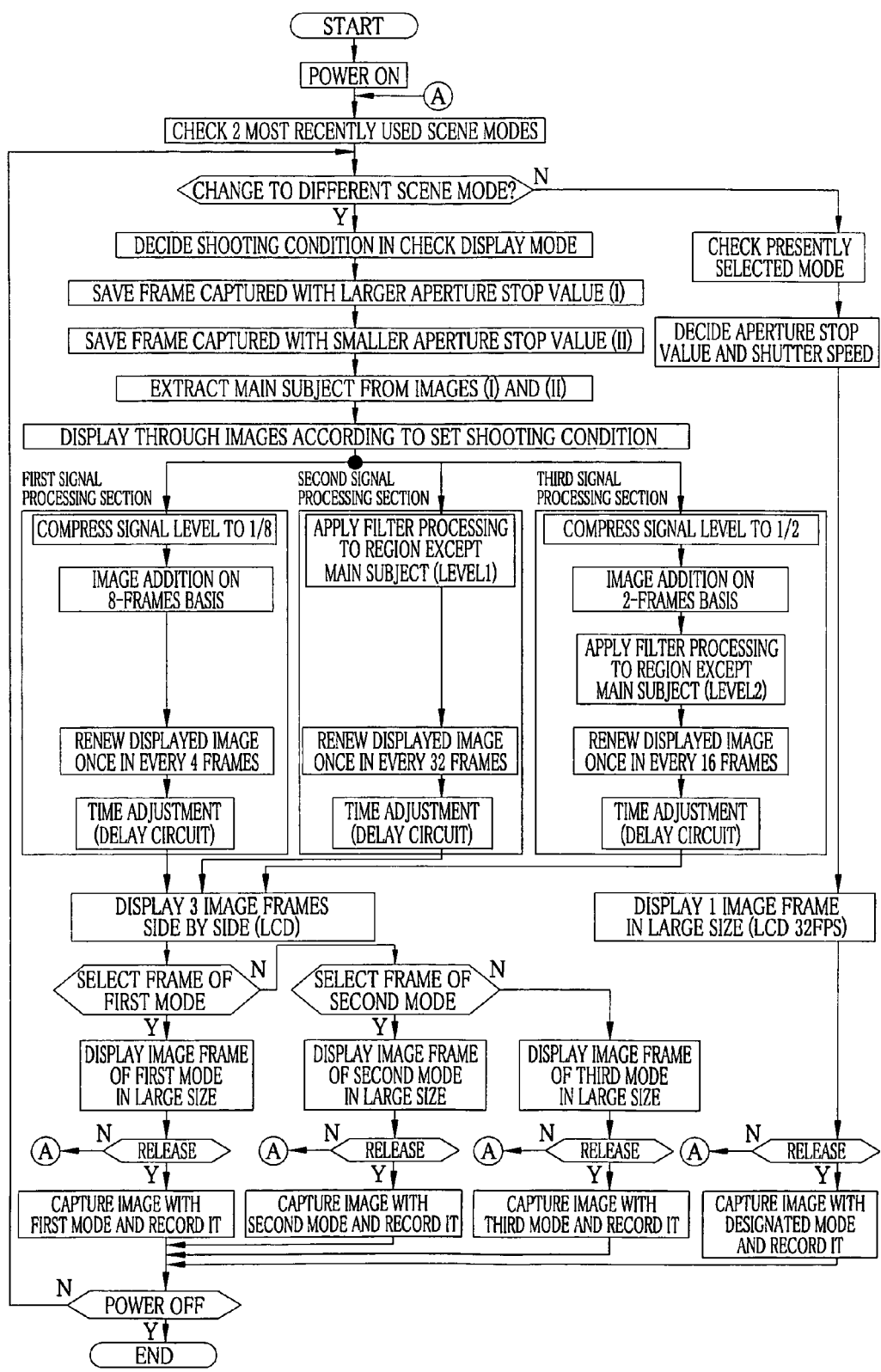
FIG. 12 is a flow chart showing the fourth embodiment.

As shown in FIG. 12, the CPU 16 confirms two most recently used scene modes when the power is turned on. Since the previously selected scene modes are stored in the RAM 31, the CPU 16 can confirm the most recently used scene modes by checking the RAM 31. Then, if an operation for changing the scene mode to different one from the confirmed two scene modes, the LCD 30 is set to the check display mode showing plural simulated images side by side. The changed scene mode is stored in the RAM 31. When one of the confirmed scene modes is selected, the LCD 31 is set to the normal display mode.

When changing the scene mode, a desired one is selected from the plural scene modes displayed on the sub LCD 34. The selected scene mode is set as a first mode. The two previously used scene modes are set as second and third modes. In this embodiment, the first mode is the landscape mode, the second mode is the sports mode, and the third mode is the portrait mode.

The first mode as the landscape mode has, for example, the aperture stop of f11, the shutter speed of $1/128$ sec, and the ISO sensitivity of 100 based on the correct exposure value. The second mode as the sports mode has, for example, the aperture stop of f8, the shutter speed of $1/1024$ sec, and the ISO sensitivity of 400 to have high shutter speed. The third mode as the portrait mode has, for example, the aperture stop of f5.6, the shutter speed of $1/512$ sec, and the ISO sensitivity of 100 to have large depth of field.

The CPU 16 decides the shooting condition for the framing based on the first to third modes. The largest f-number (f11) and the fastest shutter speed ($1/1024$ sec) among the shooting conditions of the first to third modes are selected. When it is underexposed, the ISO sensitivity is made higher to achieve appropriate exposure. Therefore, the shooting condition is set to be: the aperture stop value of "f11", the shutter speed of "$1/1024$ sec", and the ISO sensitivity of "800".

In the sports mode and the portrait mode, the f-numbers are set larger than the landscape mode. Therefore, the obtained images should have blurred background. In order to do so, the CPU 16 selects the largest f-number and the smallest f-number (f11 and f5.6 in this embodiment), and the shutter speeds providing a correct exposure with respective aperture stop values are designated like the second embodiment. The CPU 16 captures images with two kinds of f-numbers, and stores the image data in the RAM 67. The main subject extractor 66 compares the two images stored in the RAM 67 and judges a region with few changes in contour components as a main subject. The main subject extractor 66 also designates a region excluding the main subject to be subjected to front and rear blur. The information is sent to the filter processing circuit 68.

After extracting the region of the main subject, an image is captured with the f-number of "f11", the shutter speed of "$1/1024$ sec", and the ISO sensitivity of "800". Original image data obtained under this condition is sent to the first to third signal processing sections 61 to 63. The first signal processing section 61 produces a frame simulating the shooting condition corresponding to the landscape mode. That is, the signal level compression circuit 64 compresses the signal level of the original image data to "$1/8$". Thereafter, the frame adding processing is performed to the image data by the composition processing circuit 65, and thereby producing an image with the main subject blurred. For example, when the shutter speed in the landscape mode is "$1/128$ sec", the frame rate corresponding to this shutter speed is "128 fps". When the frame rate of the original image data is "1024 fps", an image needs to be produced once in every 8 frames (every eighth frame) (8=1024/128). Therefore, an image is added on an 8-frames basis. That is, 8 frames are produced in one second and a frame is renewed once in every four frames.

The second signal processing section 62 produces a frame simulating the shooting condition corresponding to the sports mode. That is, the filter processing circuit 68 performs the 30 filter processing to the region excluding the main subject. The filter processing here is performed with middle level of the blur strength (blur level 1) since the f-number of the sports mode is smaller than the landscape mode and larger than the portrait mode. After the filter processing, when the frame rate of the LCD 30 is, for example, 32, an image is renewed once in every 32 frames (every thirty second frame) and displayed on the LCD 30. For this configuration, an images of frame produced in the second signal processing section 62 has blurred background.

The third signal processing section 63 produces a frame simulating the shooting condition corresponding to the portrait mode. That is, the signal level compression circuit 64 compresses the signal level of the original image data to "½". Thereafter, the frame adding processing is performed to the image data by the composition processing circuit 65, and thereby producing an image with the subject blurred. For example, when the shutter speed in the portrait mode is "⅟₅₁₂ sec", the frame rate corresponding to this shutter speed is "512 fps". When the frame rate of the original image data is "1024 fps", an image needs to be produced once in every 2 frames (every second frame) (2=1024/512). Therefore, an image is added on a 2-frames basis. That is, 2 frames are produced in one second. After that, the filter processing circuit 68 performs the filter processing to the region excluding the main subject, and thereby producing an image with blurred background. The filter processing here is performed with high level of the blur strength (blur level 2) since the f-number of the portrait mode is smaller than other modes. After the filter processing, an image is renewed once in every 16 frames and displayed on the LCD 30.

The delay circuit 38 provided in each of the signal processing sections 61 to 63 is individually controlled by the CPU 16 such that the timing of the image data input to the image composition section 39 are synchronized. The image composition section 39 merges the image frames produced in the signal processing section 61 to 63 to be displayed on the screen 30a side by side. The first image is simulated under the shooting condition of the landscape mode, the second image is simulated under the shooting condition of the sports mode, and the third image is simulated under the shooting condition of the portrait mode.

The three images are observed and a desired image is touched. Then the scene mode corresponding to the touched image is selected. After that, the LCD 30 is set to the normal display mode, and the selected image is displayed large on the screen 30a. When the shutter button 23 is pressed, an image is recorded under the shooting condition of the selected scene mode.

In the fourth embodiment, one designated scene mode and two previously used scene modes are used. Instead of the two most recently used scene modes, it is possible to use two most frequently used scene modes. In this case, the scene modes may be displayed on the screen 30a in decreasing order of frequency in use from right to left. Moreover, it is possible to designate three scene modes. The number of the scene modes can be two, or four or more. The scenes are not limited to the landscape, sports, and portrait, but may be, for example, fireworks, beach, snow, sunset, museum, party, flower close-up, documents, and the like.

In the first to fourth embodiments, general image processing is performed in the digital signal processing circuit 15, and then the simulation is performed based on the shooting condition in the first and second signal processing sections. It is also possible to provide the digital signal processing circuit 15 with the functions of the first and second signal processing sections. For this configuration, the digital signal processing circuit 15 performs simulation based on the shooting condition, and also performs general image processing for the image recording when the shutter button 23 is pressed.

Fifth Embodiment

Figure 13:
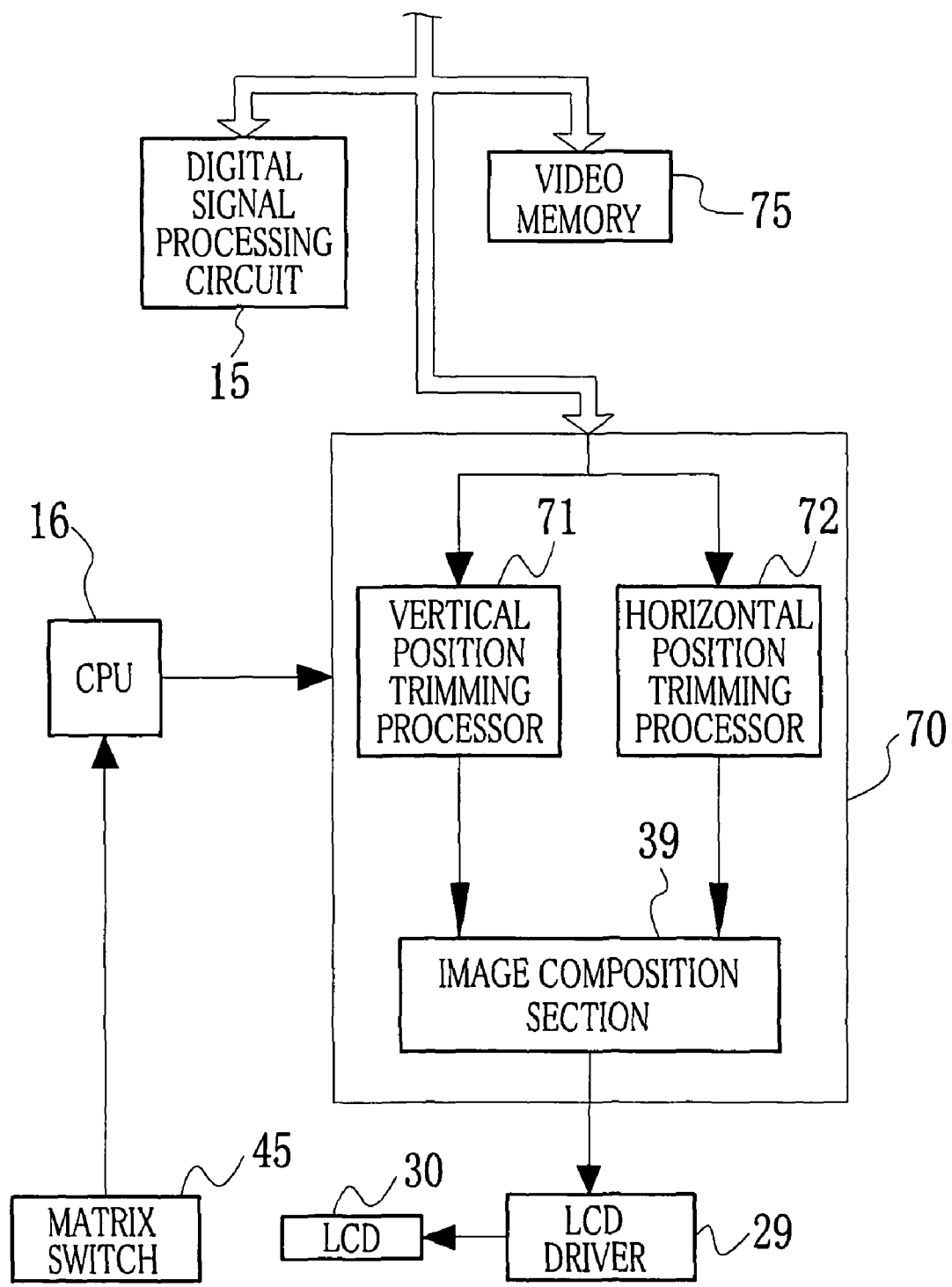
FIG. 13 is a block diagram showing a configuration of a display controller according to a fifth embodiment in which a vertical image and a horizontal image are displayed side by side.
Figure 14:
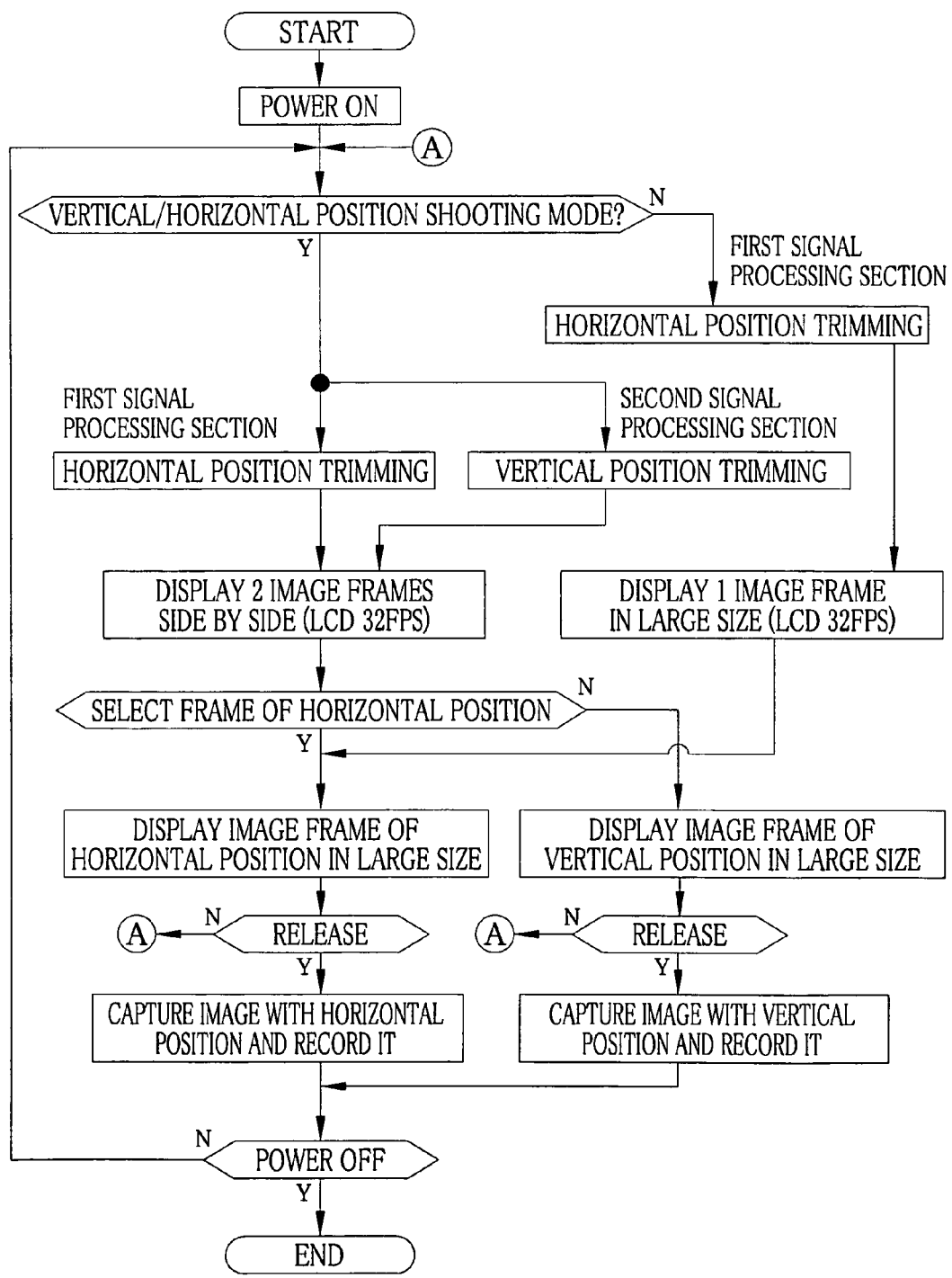
FIG. 14 is a flow chart showing the fifth embodiment.

According to a fifth embodiment, an image captured with camera in horizontal position and an image captured with camera in vertical position are displayed side by side. As shown in FIG. 13, original image data output from the digital signal processing circuit 15 (see FIG. 1) is once stored in a video memory 75. Then, the image data is read out from the video memory 75 and sent to a display controller 70. The display controller 70 is provided with a vertical position trimming processor 71 and a horizontal position trimming processor 72. The vertical position trimming processor 71 trims sides of the square image to make it vertically long. The horizontal position trimming processor 72 trims top and bottom of the square image to make it horizontally long. Note that the aspect ratios of the two images are preferably the same.

Figure 15:
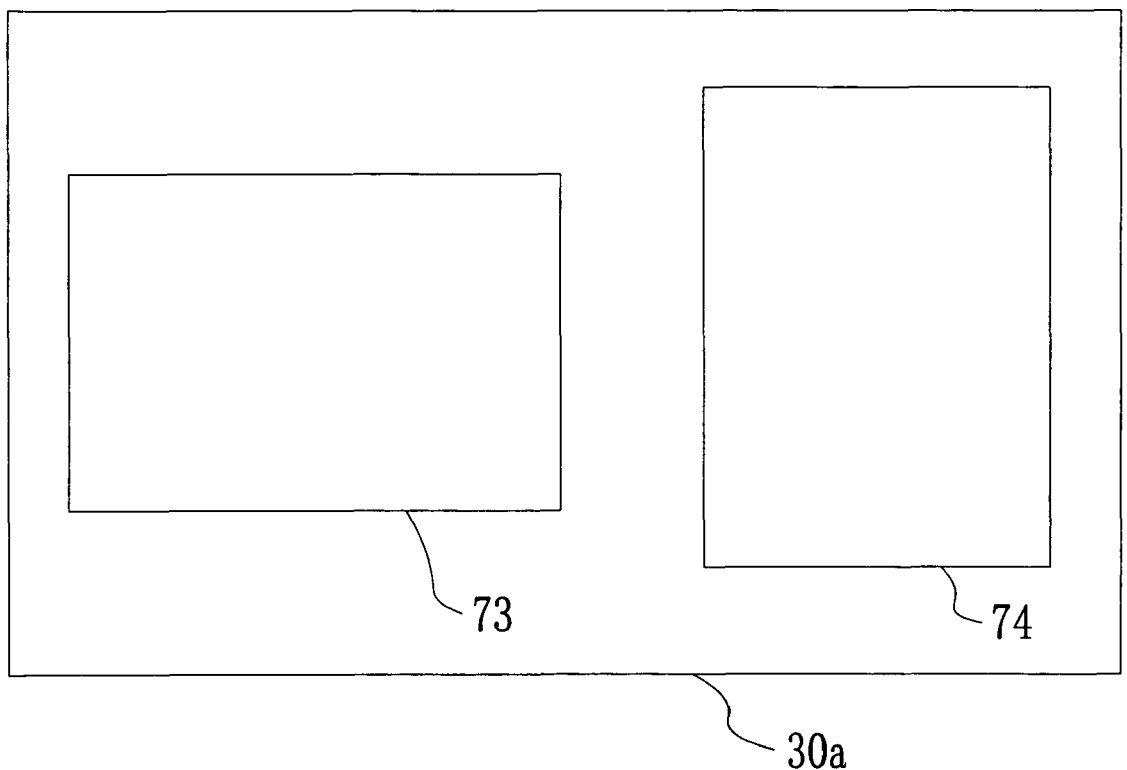
FIG. 15 is an explanatory view showing images displayed on the screen.

When vertical/horizontal position shooting mode is designated, the LCD 30 is set to the check display mode. The original image data is respectively sent to the vertical position trimming processor 71 and the horizontal position trimming processor 72 and subjected to the trimming processing. Image frames produced in the trimming processors 71 and 72 are merged in the image composition section 39, and then sent to the LCD driver 29. Thereafter, a horizontal position image 73 and a vertical position image 74 are displayed on the screen 30a of the LCD 30 as shown in FIG. 15.

In this way, frames are obtained using the image sensor having a square light receiving surface, and the vertical position image and the horizontal position image are produced by trimming the substantially square frames. Owing to this, the shooting angle does not vary from image to image.

Among the two images 73 and 74 displayed on the screen 30a, one captured with desired camera position is touched. Then, the desired camera position is selected, and the touched image is displayed large on the screen 30a. When the shutter button 23 is pressed, a frame corresponding to the selected camera position is produced by one of the trimming processors and recorded in the memory card and the like. It is possible that the frame produced during the framing is recorded in the memory card without recapturing an image when the shutter button 23 is pressed.

In the above embodiments, although plural images are displayed on one LCD 30, plural LCDs may be provided to display images respectively.

It is preferable that two or more of the first to fifth embodiments are adopted and the adopted embodiments are selectively used. In this specification, the digital camera 10 is used for the explanation, however, the present invention is also applicable to camera phones and the like.

Various changes and modifications are possible in the present invention and may be understood to be within the present invention.

What is claimed is:

1. An image display device having a display for displaying images comprising:
    an image sensor for converting an image of a subject into an image signal;
    a driver for chronologically retrieving said image signal by driving said image sensor at a predetermined frame rate;
    a plurality of signal processing sections wherein each signal processing section concurrently simulates a different photographic effect of said image signal based on different shooting conditions including shutter speeds or different shooting modes by processing said image signal;
    a display controller for displaying images of a plurality of image frames produced in said plurality of signal processing sections side by side on said display;
    a designator for designating said shooting conditions or said shooting modes;
    a selector for selecting one of said plurality of image frames displayed on said display, wherein when releasing a shutter, an image is recorded under the shooting condition or said shooting mode corresponding to said selected image,
    wherein said plurality of signal processing sections comprises at least a first signal processing section and a second signal processing section, said first signal processing section simulating a first image frame based on a first shooting condition designated by said designator and said second signal processing section simulating a second image frame based on a second shooting condition designated by said designator,
    wherein said first shooting condition comprises a first shutter speed and said second shooting condition comprises a second shutter speed slower than said first shutter speed, said image signal obtained with said first shutter speed being input to said first signal processing section and said second signal processing section to produce said first image frame and said second image frame,
    wherein when a frame rate corresponding to said second shutter speed is slower than a frame rate of said display, said first signal processing section or said second signal processing section performs frame adding to said image signal from said image sensor such that said frame rate of said image sensor corresponds to said frame rate of said display.

2. The image display device according to claim 1, wherein when the frame rate of said image sensor is faster than a frame rate of said display, said first signal processing section or said second signal processing section performs frame thinning to said image signal from said image sensor such that the frame rate of said image sensor corresponds to the frame rate of said display.

3. The image display device according to claim 1, wherein said first shooting condition comprises a first aperture stop value and said second shooting condition comprises a second aperture stop value providing an aperture size larger than said first aperture stop value, said image signal obtained with said first aperture stop value being input to said first signal processing section and said second signal processing section to produce said first image frame and said second image frame.

4. The image display device according to claim 3, wherein said second signal processing section comprises:
    a memory for storing, before producing said first image frame and said second image frame, a first image captured with said first aperture stop value and a second image captured with said second aperture stop value;
    a main subject extractor for extracting a region with few changes in contour components as a main subject by comparing said first image with said second image; and
    a filter processing circuit for performing filter processing to said image signal such that a region excluding said main subject is blurred.

5. The image display device according to claim 1, wherein said first shooting condition comprises a first exposure value providing correct exposure and said second shooting condition comprises a second exposure value increased or decreased by a predetermined exposure compensation value with respect to said first exposure value, said image signal obtained with said first exposure value being input to said first signal processing section and said second signal processing section to produce said first image and said second image frame.

6. The image display device according to claim 1, wherein said first signal processing section simulates said first image frame based on a first shooting mode and said second signal processing section simulates said second image frame based on a second shooting mode.

7. The image display device according to claim 6, wherein said first image frame and said second image frame are produced by inputting said image signal to said first signal processing section and said second signal processing section, wherein said image signal is obtained with a large aperture stop value and a high shutter speed, said large aperture stop value providing a smallest aperture size, and said high shutter speed providing a fastest shutter speed, wherein an ISO sensitivity is designated so as to provide correct exposure under said large aperture stop value and said high shutter speed.

8. The image display device according to claim 7, wherein said first shooting mode is designated by said designator and said second shooting mode comprises one of shooting modes previously used.

9. The image display device according to claim 8, wherein said second shooting mode comprises a most frequently used mode among said previously used shooting modes.

10. The image display device according to claim 6, wherein said first shooting mode comprises a horizontal position shooting mode and said second shooting mode comprises a vertical position shooting mode.

11. The image display device according to claim 10, wherein said image sensor has a square light receiving surface and said first signal process section and said second signal processing section crop an image of said subject.

12. An image display method for displaying images on a display during framing comprising file steps of:
    converting an image of a subject into an image signal;
    producing concurrently a plurality of image frames comprising a first image frame from a first processing section and a second image frame from a second processing section, the first and second image frames being simulated based on different shooting conditions including shutter speeds or different shooting modes by processing said image signal;
    displaying images of said first image frame and said second frame side by side on said display;
    designating said shooting conditions or said shooting modes; and
    selecting one of said plurality of frames displayed on said display, wherein when releasing a shutter, an image is recorded under said shooting condition or said shooting mode corresponding to said selected image.

13. The image display method according to claim 12, wherein said frame producing step comprising at least one of the following steps (A) to (E):

(A) a shutter priority mode including the steps of:
designating a first shutter speed as said first shooting condition and a second shutter speed as said second shooting condition, said first shutter speed is faster than said second shutter speed;
activating said image sensor at a frame rate corresponding to said first shutter speed to obtain said image signal; and
producing said first frame captured with said first shutter speed and said second frame captured with said second shutter speed,
(B) an aperture priority mode including the steps of:
designating a first aperture stop value as said first shooting condition and a second aperture stop value as said second shooting condition, said first aperture stop value providing an aperture size smaller than said second aperture stop value;
extracting, before producing said frames, a region with few changes in contour components as a main subject by comparing a first image captured with said first aperture stop value with a second image captured with said second aperture stop value;
activating said image sensor using said first aperture stop value to obtain said image signal; and
producing said first frame from said image signal, and said second frame by performing filter processing to said image signal such that a region excluding said main subject is blurred,
(C) an exposure compensation mode including the steps of:
designating a first exposure value as said first shooting condition and a second exposure value as said second shooting condition, said first exposure value providing correct exposure, said second exposure value providing higher or lower exposure amount compared to said correct exposure value; and
producing said first frame and said second frame from said image signal obtained with said first exposure value,
(D) a scene designation mode including the steps of:
designating said first shooting mode, wherein one of shooting modes previously used is automatically selected as said second shooting mode;
selecting a large aperture stop value providing smallest aperture size and a high shutter speed providing fastest shutter speed among said shooting conditions of said first shooting mode and said second shooting mode;
setting an ISO sensitivity so as to provide correct exposure under said large aperture stop value and said high shutter speed; and
producing said first frame and said second frame from said image signal obtained under the selected shooting condition,
(E) a camera posture designation mode including the steps of:
designating a horizontal position shooting mode as said first shooting mode and a vertical position shooting mode as said second shooting mode; and
producing said first frame and said second frame by applying cropping processing to said image signal from said image sensor.

14. The image display device according to claim 1, wherein said display controller further comprises:
an image compensation section to reduce the size of said first image frame and said second image frame, wherein said image compensation section also merges said first image frame and said second image frame.

15. The image display device according to claim 4, wherein said selected image is recorded in said memory without recapturing said selected image.

16. An image display device having a display for displaying images comprising:
an image sensor for converting an image of a subject into an image signal;
a driver for chronologically retrieving said image signal by driving said image sensor at a predetermined frame rate;
a plurality of signal processing sections wherein each signal processing section concurrently simulates a different photographic effect of said image signal based on different shooting conditions including shutter speeds or different shooting modes by processing said image signal; and
a display controller for displaying images of a plurality of image frames produced in said plurality of signal processing sections side by side on said display.

* * * * *